Dec. 1, 1964   A. J. BOWHILL   3,158,924
METHODS OF MANUFACTURING JOURNAL AND JOURNAL BEARING MEMBERS
Filed May 17, 1962
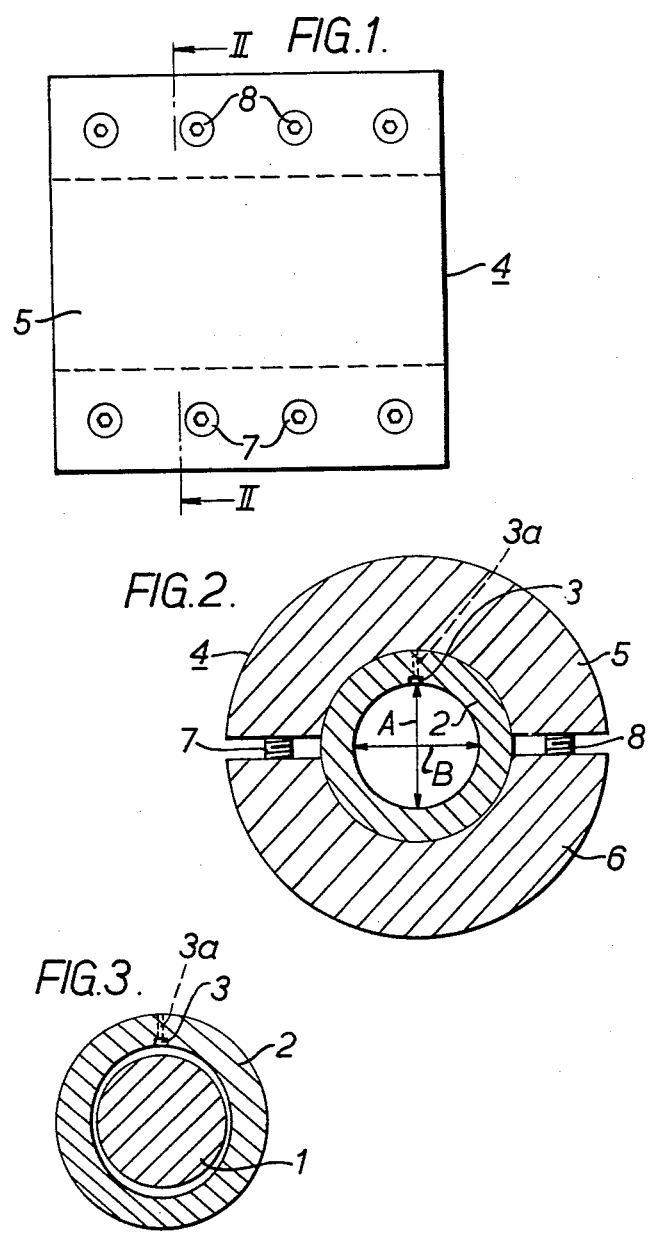

3,158,924
METHODS OF MANUFACTURING JOURNAL AND
JOURNAL BEARING MEMBERS
Arthur John Bowhill, Neston, Wirral, England, assignor to United Kingdom Atomic Energy Authority, London, England
Filed May 17, 1962, Ser. No. 195,639
Claims priority, application Great Britain May 17, 1961
2 Claims. (Cl. 29—149.5)

This invention relates to methods of manufacturing journal and journal bearing assemblies designed for operation with gas lubrication between the journal member and the journal bearing member.

One problem encountered in the use of such assemblies is that of the onset of whirl at a certain speed of rotation (the whirl-onset speed) which thus limits the maximum operating speed. With increasing interest in the use of such assemblies for high speed operation attention is currently being directed to methods of manufacturing these assemblies with a view toward increasing the whirl-onset speed.

According to the present invention a method of manufacturing a journal and journal bearing assembly designed for operation with gas lubrication between the journal member and the journal bearing member comprises machining the members to form thereon bearing surfaces of true circular cross-section, radially stressing one of the members to deform its bearing surface cross-section, and machining the stressed member so that on releasing the radial stressing its bearing surface cross-section has a number of lobes.

By way of example, the invention will now be described with reference to the accompanying drawings in which:

FIGURE 1 is a plan view of one form of apparatus used,

FIGURE 2 is a section on the line II—II of FIGURE 1, and

FIGURE 3 is a cross-sectional view of an assembly made in accordance with the invention.

The drawings show a journal in the form of a solid shaft 1 and a journal bearing in the form of a sleeve 2. The shaft 1 is machined by honing to have an external bearing surface of true circular cross section. The sleeve 2 is machined to form a groove or slot 3 extending longitudinally over a central portion of the sleeve 2, and is also drilled to form a vent hole 3a providing communication between the groove 3 and the outside of the sleeve 2. The sleeve 2 is then machined by honing its inner grooved surface to have an internal bearing surface of true circular cross-section (in this context the groove 3 is not to be considered as affecting the general or overall bearing surface cross-section). Typically the bearing surface is honed so as to be truly circular to an accuracy of $0.5 \times 10^{-4}$ inches. The outer surface of the sleeve 2 is also machined by honing so as to be of truly circular cross-section. The sleeve 2 is then radially stressed by applying an external diametral clamping force to the sleeve 2 along its length so as to deform the cross-section of the internal bearing surface of the sleeve 2. The external diametral clamping force is applied using apparatus 4 comprising two semi-circular clamps 5, 6 connected together by two rows of screws 7, 8. The apparatus 4 is formed from a tubular blank which is first honed to form an inner surface corresponding exactly to the outer surface of the sleeve 2, is then drilled and tapped to take the screws 7, 8 and then cut longitudinally to form the two clamps 5, 6. With the clamps 5, 6 assembled about the sleeve 2, the screws 7, 8 are tightened to apply the required clamping force to the sleeve 2, the deformation of the internal bearing surface being measured by "Solex" plug gauges. The radially stressed sleeve 2 is then machined by honing the bearing surface. The hone used has a radially adjustable and longitudinally extending honing stone mounted in a bar having two guides each positioned at an angle of one hundred and twenty degrees relative to the honing stone. The honing stone is adjusted until it just engages the bearing surface which is then honed to a circular cross-section (as checked by gauges whilst the sleeve 2 is stressed) so that on releasing the clamping force the bearing surface cross-section has two diametrically opposed lobes. The lobes extend along the length of the sleeve 2 and the bearing surface is of approximately elliptical cross-section having its major axis in the direction of the applied clamping force as indicated by dimension arrow A. The groove or slot 3 thus lies in one of the lobes and is positioned at one end of the major axis when viewed in cross-section. Machining the slot 3 before honing the sleeve 2 (unstressed and stressed operations) avoids distortion.

For a nominal three inch length and one inch internal diameter sleeve 2 of a quarter inch wall thickness, typical dimensions at various stages during the manufacture of the assembly are as follows.

|  | Inches |
|---|---|
| Depth and width of groove or slot 3 | 1/32 |
| Length of centrally positioned groove or slot 3 | 1.5 |
| Diameter of honed shaft 1 | 0.995 |
| Internal diameter of sleeve 2 after initial honing to true circular cross-section | 1.00005 |
| Sleeve 2 radially stressed by clamps 5, 6 to give: | |
| Dimension indicated by arrow A | 0.9996 |
| Dimension indicated by arrow B | 1.0004 |
| Dimensions after honing of stressed sleeve 2 and release of clamping force: | |
| Dimension indicated by arrow A | 1.0007 |
| Dimension indicated by arrow B | 1.0002 |

An assembly made in accordance with the invention has a significantly increased whirl-onset speed. Thus for a horizontal shaft of two inches diameter and mass of 24 lbs. rotating in two six inch long sleeves each having an elliptical bearing surface and vented groove or slot as described above, the whirl-onset speed is 18,000 r.p.m. for a major axis diametral clearance between shaft and sleeve of $21 \times 10^{-4}$ inches and a minor axis diametral clearance of $11 \times 10^{-4}$ inches. Rotation of the shaft draws ambient gas into the clearances to provide gas lubrication between the shaft and the sleeves. By way of comparison, for the same shaft rotating with gas lubrication in two six inch long sleeves each having a bearing surface of true circular cross-section and a vented groove or slot, the whirl-onset speed is only 12,000 r.p.m. for the same mean diametral clearance (i.e. $16 \times 10^{-4}$ inches). (Note that in FIGURE 3 the clearance between the shaft 1 and the sleeve 2 is shown greatly enlarged for the sake of clarity.)

When used with the shaft vertically orientated, the assembly described above by way of example has a whirl-onset speed of at least 11,000 r.p.m. (depending upon the mass) whereas an assembly having bearing surfaces of true circular cross-section is unstable without the application of excess gas pressure to the groove or slot to impose a lateral force on the shaft.

The clamps 5, 6 may be of smaller arcuate extent than the semicircular form shown in the drawings providing they serve to apply a diametral clamping force to the sleeve 2. Alternatively the radial stressing may be applied by fluid pressure.

The journal may be in the form of a hollow shaft which is internally stressed and externally machined to form an external bearing surface having a cross-section with a number of lobes.

The invention may be applied to the formation of trefoil shaped bearing surfaces having three lobes.

I claim:
1. Method of manufacturing a journal and journal bearing assembly designed for operation with gas lubrication between the journal member and journal bearing member, the journal member being in the form of a solid shaft and the journal bearing member being in the form of a sleeve, comprising machining the shaft to form thereon an external bearing surface of true circular cross-section, machining the sleeve to form a longitudinally extending groove in its inner surface, machining the inner surface of the sleeve to shape the ungrooved portion to true circular cross-section, radially stressing the sleeve by applying to it a controlled external diametral clamping force to deform its inner surface cross-section, the groove lying at one end of the diameter of the applied clamping force, machining the inner surface of the stressed sleeve to shape the ungrooved portion to true circular cross-section, and releasing the clamping force whereby said inner surface forms a bearing surface of elliptical cross-section having said groove lying at one end of the major axis.

2. The method claimed in claim 1, wherein the sleeve is machined to form a vent hole communicating between the groove and the outside of the sleeve.

References Cited in the file of this patent

UNITED STATES PATENTS

| | | |
|---|---|---|
| 2,559,621 | Hill | July 10, 1951 |
| 2,796,659 | Buske | June 25, 1957 |
| 2,913,859 | Koch | Nov. 24, 1959 |
| 2,983,560 | Pitner | May 9, 1961 |